Aug. 15, 1933.  A. P. THOMPSON  1,922,872
METHOD OF REMOVING HYDROGEN SULPHIDE FROM NATURAL GAS
Filed Dec. 22, 1927
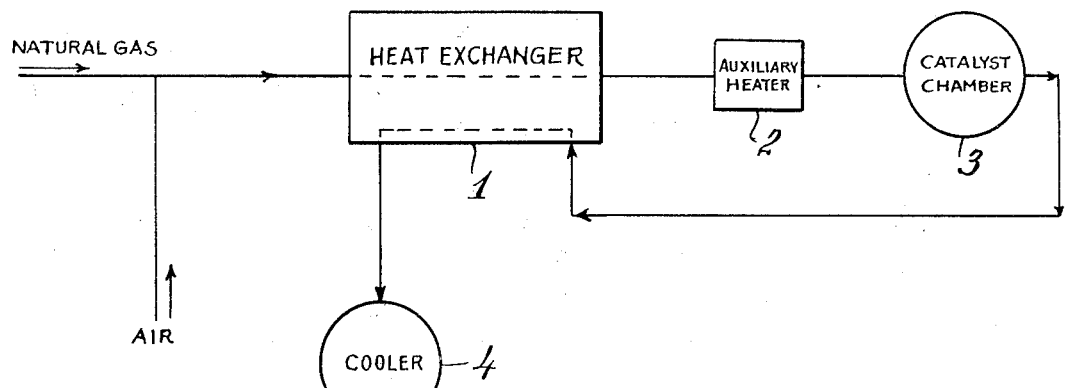
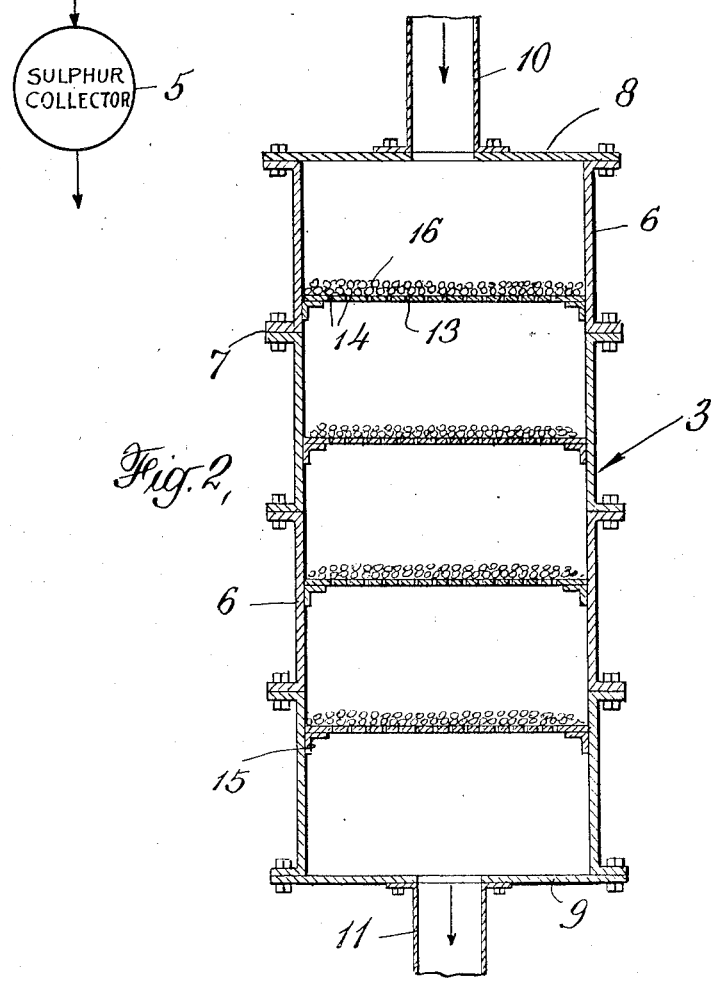
INVENTOR
ALFRED PAUL THOMPSON
BY Forbes Silsby
ATTORNEY Patented Aug. 15, 1933

1,922,872

UNITED STATES PATENT OFFICE 1,922,872

METHOD OF REMOVING HYDROGEN SULPHIDE FROM NATURAL GAS

Alfred Paul Thompson, Long Island City, N. Y., assignor to General Chemical Company, New York, N. Y., a Corporation of New York Application December 22, 1927
Serial No. 241,782

5 Claims. (Cl. 23—225)

My invention relates to a method of treating gases containing hydrogen sulphide and more particularly to a method of removing hydrogen sulphide from natural gas and recovering free sulphur without decomposing the other valuable constituents of the gas.

One of the major problems connected with the industrial utilization of certain gases for fuel purposes is that arising from the presence of hydrogen sulphide in the gases. This hydrogen sulphide is objectionable for various reasons, probably the most important of which is the nuisance created by the $SO_2$ resulting when the hydrogen sulphide is burned. While the presence of $H_2S$ in natural gas in appreciable amounts is not at all general, there are a number of regions in which the large quantities of natural gas available are permitted to go to waste simply because of the hydrogen sulphide with which they are contaminated. The hydrogen sulphide contained in natural gas is usually less than 1%, but in certain regions it runs as high as 10%.

The presence of hydrogen sulphide in such an inordinately large proportion as 10% precludes the possibility of such a gas being considered as a suitable fuel in its natural state, but, on the other hand, a greater inducement is thereby offered to separating it from the gas, for, simultaneously with the production of a suitable fuel gas, the sulphur obtained would be in such quantity as to constitute a valuable by-product.

In purifying the natural gas, it is eminently desirable that the $H_2S$ be removed with little or no deleterious effect upon the constituents of the gas which make it valuable as fuel, viz, hydrocarbons of the methane series, etc., and the object of my invention is to provide a cheap and efficient method of removing hydrogen sulphide from natural gas containing the same and recovering free sulphur without injuriously affecting the other valuable constituents of the gas.

I have found that by contacting the natural gas containing hydrogen sulphide with a suitable amount of oxidizing gas in the presence of a bauxite catalyst, that a selective oxidation of the $H_2S$ takes place which results in the efficient production of free sulphur at a temperature appreciably below that at which the other constituents of the gas will be affected.

In the following specification, I have described a preferred manner of carrying out the method of my invention, and in the drawing which accompany the same.

Fig. 1 is a diagrammatic arrangement of apparatus for practising my invention, and Fig. 2 is a vertical sectional view of a form of catalyst chamber which may be comprised therein.

The compositions of natural gases containing hydrogen sulphide vary appreciably, and while any well-known natural gas containing hydrogen sulphide is amenable to treatment according to the method of my invention, for the purpose of the present specification I will concern myself with a natural gas containing the very high percentage of $H_2S$ (10%) hereinbefore noted. The composition of a fairly typical natural gas in this category was as follows:

| | Per cent |
|---|---|
| $CH_4$ | 80 |
| Higher hydrocarbons of the methane series | 5 |
| $H_2S$ | 10 |
| $O_2$, $N_2$, $CO_2$, etc. | 5 |

The natural gas noted is first mixed with a suitable amount of oxidizing gas, e. g. air, to provide the oxygen required for the selective oxidation of the hydrogen sulphide in the gas, according to the typical equation:

$$2H_2S + O_2 = 2H_2O + 2S$$

While it might be expected that any appreciable excess of oxygen over that indicated by the equation noted would tend to cause oxidation of some of the sulphur to $SO_2$, I have found that such is not the case under the conditions of my operation. In one instance, for example, twice as much air was used as that called for theoretically without any marked evidence of $SO_2$ being formed thereby.

The mixture of natural gas and air is then passed through a heat exchanger 1 of any well-known type wherein the mixture is heated by the hot gases resulting from a later step in the operation as will be described hereinafter, and, after leaving the heat exchanger, the gaseous mixture may be heated further by a suitable auxiliary heater 2 in the event such is necessary. The temperature at which the preheated gases are introduced into the catalyst chamber 3 from the preheating system should not exceed 275° C., and for the particular gas in question is preferably about 225° C.

The catalyst chamber 3 may be of any suitable construction, and in Fig. 2 I have shown one specific form which it may take. The chamber shown comprises a series of superposed flanged cylinders 6 bolted or otherwise secured together as at 7 through the medium of the adjoining flanges, the top of the composite cylinder construction being covered by the crown plate 8 and the bottom by the base plate 9. Crown plate 8 is provided with an inlet pipe 10 secured thereto in any well-known manner, and base plate 9 is provided with a corresponding outlet pipe 11. The foregoing structure is all constructed of cast iron or steel. In the interior of the composite cylinder a series of vertically spaced steel shelves 13 are mounted, each of which carries a layer of the catalyst 16. Gas passages 14 are provided in the shelves to permit the flow of gas through the chamber, which passages are of appropriate size to retain the particles of catalyst upon the respective shelves, and around the wall of the chamber suitable angle irons 15, or other means, are secured in any suitable manner to provide supports for the shelves 13. As will be noted from the relative positions of the inlet 10 and the outlet 11, the catalyst chamber is preferably operated under downdraft, although the reverse operation may be utilized if desired.

The catalyst which characterizes the method of my invention is bauxite, a quite satisfactory natural form being that commonly known as British Guiana bauxite. The composition of a fairly typical bauxite of this variety is as follows:

|  | Per cent |
|---|---|
| Alumina ($Al_2O_3$) | 60.0 |
| Ferric oxide ($Fe_2O_3$) | 2.6 |
| Titanium oxide ($TiO_2$) | 3.6 |
| Silica ($SiO_2$) | 4.5 |
| Loss on ignition | 29.0 |

In using the bauxite catalyst I have found it preferable to increase the porosity of the same by substantially completely dehydrating, that is "activating", the natural bauxite by treating it at a temperature sufficiently high and for a sufficiently long period to cause substantially complete dehydration. Such dehydration may be accomplished by slowly heating the natural bauxite to a temperature of 400° C., or above, and maintaining such temperature for several hours, the exact temperature and period required being dependent, however, on the type of bauxite. It is undesirable to heat treat the bauxite at a temperature greatly in excess of that required for substantially complete dehydration, since in so doing the beneficial results are thereby somewhat decreased. The resulting activated product is found to possess somewhat greater catalytic activity than the natural mineral. I have found, furthermore, that the catalytic activity of this activated bauxite is further enhanced by the addition of a promotor such as $Fe_2O_3$. The promotor may be incorporated in the bauxite by impregnating the activated bauxite with ferric nitrate and then igniting to obtain $Fe_2O_3$ deposited throughout the bauxite. The catalyst is preferably used in the form of small fragments of a size best suited for operation under the specific conditions existing. For the operation described herein I have found that a particle size of through 2 on 6 mesh (to the inch) was satisfactory, although it is not essential that the particle size be limited to the specific size noted.

The preheated mixture of natural gas and air, preferably at a temperature of approximately 225° C. as noted, is passed into the chamber 3 containing the bauxite catalyst, and therein the hydrogen sulphide in the natural gas is caused to react with the oxygen of the air in the presence of the catalyst to yield sulphur and water according to the equation hereinbefore noted, the remaining valuable constituents of the natural gas being substantially unchanged. It is essential to the proper operation of the method of my invention that the 275° C. temperature limit in the catalyst chamber be not exceeded, for above this temperature I have found that the valuable hydrocarbon constituents of the natural gas are seriously decomposed, this decomposition increasing in proportion as the 275° C. limit is exceeded. The selective oxidation of the hydrogen sulphide to sulphur and $H_2O$ is pronouncedly exothermic, and, in most cases, it is necessary to make suitable provision for counteracting the resultant tendency to elevate the temperature in the catalyst chamber above 275° C. The excess heat may be removed in any well-known manner, for example as in the construction illustrated in Fig. 2 by the provision of an extensive radiation surface in the catalyst chamber construction.

By the use of the bauxite catalyst characterizing my invention, the relatively low upper temperature limit imposed upon the operation presents no hindrance to efficient reaction, for the velocity of reaction is remarkably satisfactory even at temperatures materially below 275° C. I have found, as a matter of fact, that 225° C. is a very satisfactory working temperature and preferably that at which my operation should be carried out with the particular sulphide content of the gas in question. At this temperature the reaction is quite intense, and the resulting sulphur is obtained substantially entirely in the vapor phase. By maintaining the temperature of the reaction at a point at which substantially all of the sulphur exists as vapor, the capacity and efficiency of the operation are materially enhanced, for the sulphur is carried out in the effluent gaseous mixture and no blocking up of the catalyst occurs. While I have given 225° C. as the preferred operating temperature, it should be understood that the reaction will proceed at temperatures below this, although the velocity of the reaction will tend to decrease somewhat as the temperature lowers.

The hot effluent gases from the catalyst chamber 3 are passed back through the heat exchanger 1 where they give up a considerable amount of their heat to the entering gases, and are thence conducted into a cooler 4 operating in conjunction with a sulphur collector or filter 5. In this cooler and collector the temperature of the gases is reduced to 120–150° C. and the sulphur separated from the gases by condensation and collected. The cooler 4 and collector 5, as is also the case as regards the heat exchanger 1, the auxiliary heater 2, and the catalyst chamber 3, may be of any suitable and well-known construction, the particular construction of the elements of the apparatus constituting no part of my invention.

While I prefer to produce the sulphur in the vapor phase because of the operating advantages which result therefrom, the temperature in the catalyst chamber may if desired be lowered as will be apparent to one skilled in the art so that the sulphur will result in the liquid or solid phase. In the event the sulphur is to be obtained in liquid form, suitable provision should be made for tapping it off from the catalyst chamber, and in the event solid sulphur is to result, this may be taken care of by providing a plurality of catalyst chambers through one of which the reacting gases are passed while the other is being treated to remove the solid sulphur deposited upon the catalyst.

While in the exemplary operation I have noted the use of air as the source of oxygen, the oxidizing gas may be supplied as pure oxygen and also as sulphur dioxide. When sulphur dioxide is used the resulting reaction is best indicated by the equation:

$$2H_2S + SO_2 = 2H_2O + 3S$$

By following the principles above described, a very efficient desulphurization of the natural gas is secured, a very pure sulphur is produced, and a fuel gas is obtained which is practically free from the objectionable hydrogen sulphide and which retains its valuable fuel constituents unaffected except as regards a slight dilution by nitrogen when air is used. The nature of the operation is such that it is readily adaptable to practical and industrial operation and, particularly when sulphur vapor is formed in the catalyst chamber, is capable of large capacity operation. The amount of heat necessary for the reaction over and above that supplied by the reaction itself is very slight, and in many cases the heat provided by the reaction will alone be substantially sufficient to provide that necessary for appropriate preheating of the gases. The catalyst evidences no particular susceptibility to poisoning in the course of the reaction and may be used for a protracted period before any appreciable lessening of its activity is noticeable. The apparatus necessary is such that various types of well-known and readily available constructions may be used, the entire operation is easily and efficiently controlled, and but relatively slight expense is entailed.

I claim as my invention:

1. The method of removing hydrogen sulphide from natural gas containing the same which comprises reacting the natural gas with an oxidizing gas in the presence of activated natural bauxite promoted with iron oxide while maintaining the temperature below 275° C. whereby free sulphur is obtained and substantially no decomposition of the valuable constituents of the natural gas other than the hydrogen sulphide occurs, and collecting the sulphur formed.

2. The method of removing hydrogen sulphide from natural gas containing the same which comprises mixing said gas with an amount of an oxidizing gas suitable for the selective oxidation of the hydrogen sulphide in said gas to water and free sulphur, preheating said mixture to a temperature below 275° C., passing said preheated mixture in contact with a catalyst comprising activated bauxite while maintaining the temperature below 275° C. and at a point at which substantially all of the free sulphur formed will exist as a vapor, and treating the resultant gaseous mixture to extract the free sulphur therefrom.

3. The method of removing hydrogen sulphide from natural gas containing the same which comprises mixing the natural gas with an oxidizing gas in appropriate amount to provide the oxygen necessary for the selective oxidation of the hydrogen sulphide to free sulphur and water, preheating said mixture to a temperature below 275° C., passing said mixture in contact with bauxite while maintaining the temperature below 275° C. and at a point at which substantially all of the free sulphur evolved will be in the vapor phase, passing the product gases in heat exchanging relation to the cooler incoming natural gas and oxidizing gas whereby suitable preheating of the incoming natural gas and oxidizing gas is obtained, and treating the thereby cooled product gases to recover the free sulphur therefrom.

4. The method of removing hydrogen sulphide from natural gas containing the same which comprises forming a mixture of said gas with an oxidizing gas in amount suitable for the selective oxidation of the hydrogen sulphide to water and free sulphur, passing said mixture in contact with activated natural bauxite impregnated with iron oxide while maintaining the temperature below 275° C. and at a point at which substantially all of the free sulphur formed will exist as a vapor, and treating the resulting gaseous mixture to extract the free sulphur therefrom.

5. The method of removing hydrogen sulphide from natural gas containing the same which comprises passing said gas conjointly with an oxidizing gas in contact with a catalyst, prepared by activating British Guiana bauxite and promoting said activated bauxite with iron oxide, and maintaining the temperature below 275° C., said oxidizing gas being in amount suitable for the selective oxidation of the hydrogen sulphide to water and free sulphur, and collecting the free sulphur formed.

ALFRED PAUL THOMPSON.